(12) United States Patent
Deshpande

(10) Patent No.: US 9,882,665 B2
(45) Date of Patent: Jan. 30, 2018

(54) METHOD FOR DECODING A SERVICE GUIDE

(71) Applicant: SHARP KABUSHIKI KAISHA, Sakai, Osaka (JP)

(72) Inventor: Sachin G. Deshpande, Camas, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/120,383

(22) PCT Filed: Apr. 20, 2015

(86) PCT No.: PCT/JP2015/002150
§ 371 (c)(1),
(2) Date: Aug. 19, 2016

(87) PCT Pub. No.: WO2015/162903
PCT Pub. Date: Oct. 29, 2015

(65) Prior Publication Data
US 2017/0070306 A1    Mar. 9, 2017

Related U.S. Application Data

(60) Provisional application No. 61/982,158, filed on Apr. 21, 2014, provisional application No. 62/137,797, filed on Mar. 24, 2015.

(51) Int. Cl.
*H04N 7/173* (2011.01)
*H04H 60/72* (2008.01)
(Continued)

(52) U.S. Cl.
CPC ............ *H04H 60/72* (2013.01); *H04H 60/43* (2013.01); *H04N 21/2362* (2013.01);
(Continued)

(58) Field of Classification Search
CPC .. H04N 21/643; H04N 21/2362; H04H 60/72; H04H 60/43
See application file for complete search history.

(56) References Cited

U.S. PATENT DOCUMENTS

| 2003/0133043 A1* | 7/2003 | Carr | ........................ H04N 7/088 |
| | | | 348/563 |
| 2007/0041377 A1* | 2/2007 | Song | ...................... H04H 20/59 |
| | | | 370/389 |
| 2009/0260041 A1* | 10/2009 | McGinn | .................. H04L 69/18 |
| | | | 725/62 |

FOREIGN PATENT DOCUMENTS

| EP | 1 755 274 A2 | 2/2007 |
| WO | WO 2009/149383 A2 | 12/2009 |

OTHER PUBLICATIONS

Service Guide for Mobile Broadcast Services, OMA-TS-BCAST_Service_Guide-V1_0_1-20130109-A, Open Mobile Alliance, Version 1.0.1, Jan. 9, 2013, total No. of pages: 232.
(Continued)

*Primary Examiner* — John Schnurr
(74) *Attorney, Agent, or Firm* — Birch, Stewart, Kolasch & Birch, LLP

(57) ABSTRACT

A method for decoding a service guide by a decoder comprises: receiving a service description within said service guide; receiving a service media extension within said service description; receiving a major channel number, a minor channel number, and an icon within the service media extension; decoding the service guide including the service media extension, the major channel number, the minor channel number, and the icon. The service guide is associated with a service comprising a media bit stream and supported by the OMA Mobile Broadcast Services Enabler Suite (OMA BCAST).

4 Claims, 17 Drawing Sheets

| Name | Type | Category | Cardinality | Description | Data Type |
|---|---|---|---|---|---|
| ServiceMediaExtension | E1 | NM/TM | 1 | Additional information about the media services. Contains the following elements: MajorChannelNum, MinorChannelNum, icon, and element url | |
| MajorChannelNum | E2 | NM/TM | 0..1 | Major channel number of the service. The language is expressed using built-in CML attribute 'xml:lang' with this element | String |
| MinorChannelNum | E2 | NM/TM | 0..1 | Minor channel number of the service. The language is expressed using built-in CML attribute 'xml:lang' with this element | String |
| icon | E2 | NM/TM | 0..N | Url pointing to icon used to represent the service is ESG. Multiple URLs could be used to point to icons of different width and height or different representation formats. | anyURI |
| url | A | NM/TM | 1 | URL to uniquely identify the video broadcast extension. For example a URI such as the following may be used: http://www.atsc.org/XMLSchemas/ASTC/2014/3.0/ServiceExt | anyURI |

(51) Int. Cl.
*H04N 21/435* (2011.01)
*H04N 21/2362* (2011.01)
*H04N 21/414* (2011.01)
*H04N 21/434* (2011.01)
*H04N 21/438* (2011.01)
*H04N 21/643* (2011.01)
*H04H 60/43* (2008.01)

(52) U.S. Cl.
CPC ..... *H04N 21/41407* (2013.01); *H04N 21/435* (2013.01); *H04N 21/4345* (2013.01); *H04N 21/4383* (2013.01); *H04N 21/64322* (2013.01)

(56) References Cited

OTHER PUBLICATIONS

Service Guide for Mobile Broadcast Services, OMA-TS-BCAST_Service_Guide-V1_1-20131029-A, Open Mobile Alliance, Version 1.1, Oct. 29, 2013, total No. of pages: 299.

* cited by examiner

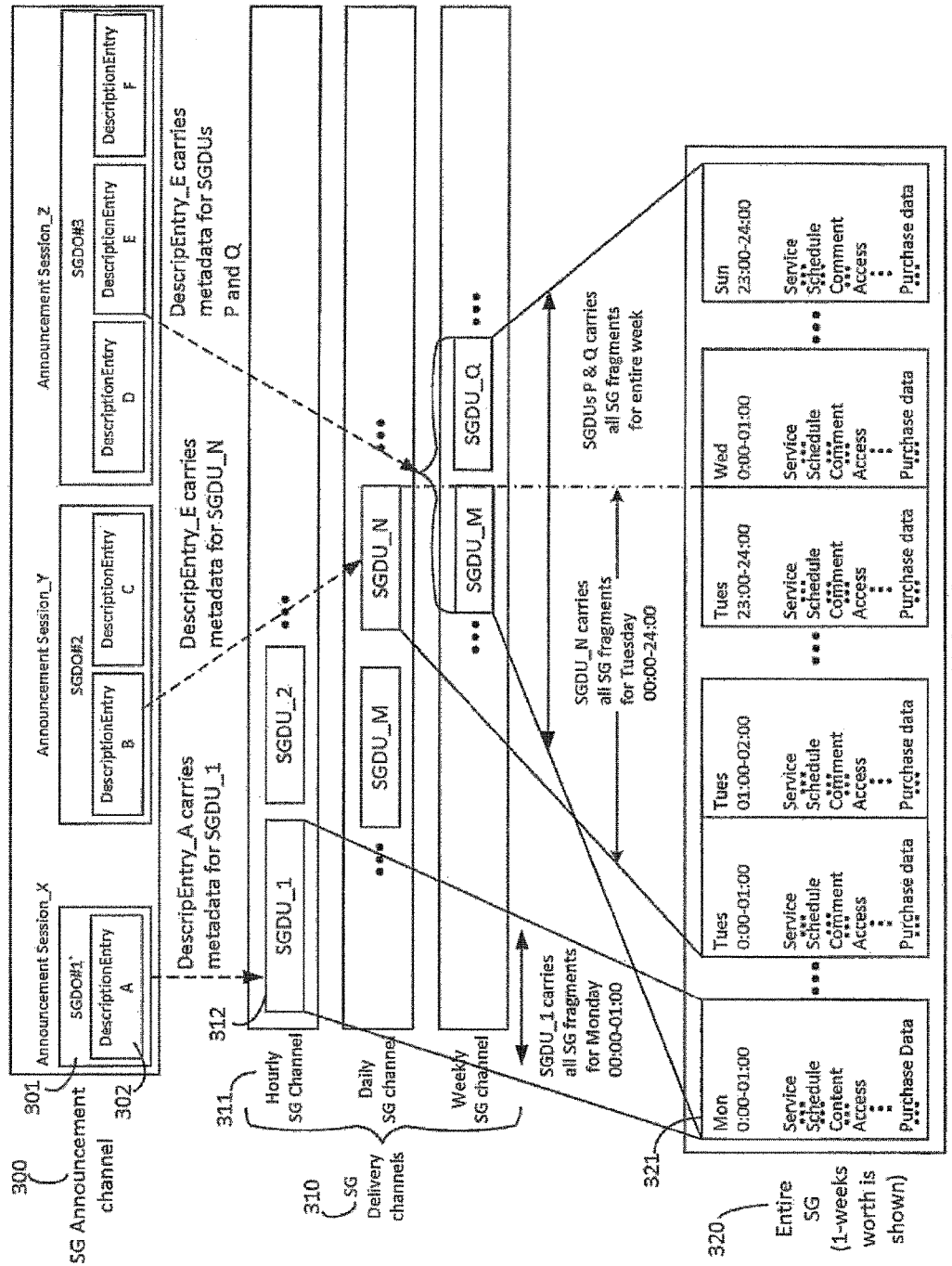

| Name | Type | Category | Cardinality | Description | Data Type |
|---|---|---|---|---|---|
| ServiceMediaExtension | E1 | NM/TM | 1 | Additional information about the media services. Contains the following elements: MajorChannelNum and MinorChannelNum | |
| MajorChannelNum | E2 | NM/TM | 0..1 | Major channel number of the service. The language is expressed using built-in CML attribute 'xml:lang' with this element | String |
| MinorChannelNum | E2 | NM/TM | 0..1 | Minor channel number of the service. The language is expressed using built-in CML attribute 'xml:lang' with this element | String |

FIG. 5

| Name | Type | Category | Cardinality | Description | Data Type |
|---|---|---|---|---|---|
| ServiceMediaExtension | E1 | NM/TM | 1 | Additional information about the media services. Contains the following element: icon | |
| icon | E2 | NM/TM | 0..N | Url pointing to icon used to represent the service is ESG. Multiple URLs could be used to point to icons of different width and height or different representation formats. | anyURI |

FIG. 6

| Name | Type | Category | Cardinality | Description | Data Type |
|---|---|---|---|---|---|
| ServiceMediaExtension | E1 | NM/TM | 1 | Additional information about the media services. Contains the following attribute: url | |
| url | A | NM/TM | 1 | URL to uniquely identify the video broadcast extension. For example a URI such as the following may be used: http://www.servicexyz.org/XMLSchemas/ASTC/2014/3.0/ServiceExt | anyURI |

FIG. 7

| Name | Type | Category | Cardinality | Description | Data Type |
|---|---|---|---|---|---|
| ServiceMediaExtension | E1 | NM/TM | 1 | Additional information about the media services. Contains the following elements: MajorChannelNum, MinorChannelNum, Icon, and element url | |
| MajorChannelNum | E2 | NM/TM | 0..1 | Major channel number of the service. The language is expressed using built-in CML attribute 'xml:lang' with this element | String |
| MinorChannelNum | E2 | NM/TM | 0..1 | Minor channel number of the service. The language is expressed using built-in CML attribute 'xml:lang' with this element | String |
| Icon | E2 | NM/TM | 0..N | Url pointing to icon used to represent the service is ESG. Multiple URLs could be used to point to icons of different width and height or different representation formats. | anyURI |
| url | A | NM/TM | 1 | URL to uniquely identify the video broadcast extension. For example a URI such as the following may be used: http://www.atsc.org/XMLSchemas/ASTC/2014/3.0/ServiceExt | anyURI |

FIG. 8

| Name | Type | Category | Cardinality | Description | Data Type |
|---|---|---|---|---|---|
| AudioLanguage | E1 | NM/TM | 0..N | This element declares for the end users that this service is available with an audio track corresponding to the language represented by the value of this element.<br><br>The textual value of this element can be made available for the end users in different languages.<br><br>In such a case the language used to represent the value of this element is signalled using the builtin XML attribute 'xml:lang'. See section 7, Multi-language support.<br><br>Contains the following attribute: languageSDPTag language | string |
| languageSDPTag | A | NM/TO | 0..1 | Identifier of the audio language described by the parent 'AudioLanguage' element as used in the media sections describing the audio track in a Session Description.<br><br>The 'languageSDPTag' may be formatted according to the rules of [RFC 3066], for the described language.<br><br>Each 'AudioLanguage' element declaring the same audio stream may have the same value of the 'languageSDPTag'. | String |
| language | A | NM/TM | 1 | Primary language for the audio component of the service | String |

FIG. 9A

| TextLanguage | E1 | NM/ TM | 0..N | This element declares for the end user that the textual components of this service are available in the language represented by the value of this element. The textual components can be, for instance, a caption or a sub-title track. | string |
|---|---|---|---|---|---|
| | | | | The textual value of this element can be made available for the end users in different languages. | |
| | | | | In such a case the language used to represent the value of this element is signaled using the builtin XML attribute 'xml:lang'. See section 7 Multilanguage support. | |
| | | | | The same rules and constraints as specified for the element 'AudioLanguage' of assigning and interpreting the attributes 'languageSDPTag' and 'xml:lang' SHALL be applied for this element also. | |
| | | | | Contains the following attribute: languageSDPTag language | |

FIG. 9B

| languageSD PTag | A | NM/ TO | 0..1 | Identifier of the text language described by the parent 'TextLanguage' element as used in the media sections describing the textual track in a string OMA-TS-BCAST_Service_Guide-V1_0_1-20130109-A Page 25 (232) Ó 2013 Open Mobile Alliance Ltd. All Rights Reserved.

Used with the permission of the Open Mobile Alliance Ltd. under the terms as stated in this document. [OMA-Template-Spec-20130101-I] Session Description. | String |
|---|---|---|---|---|---|
| language | A | NM/ TM | 1 | Primary language for the text component of the service | String |

FIG. 9C

| Name | Type | Category | Cardinality | Description | Data Type |
|---|---|---|---|---|---|
| AudioLanguage | E1 | NM/ TM | 0..N | This element declares for the end users that this service is available with an audio track corresponding to the language represented by the value of this element.<br><br>The textual value of this element can be made available for the end users in different languages.<br><br>In such a case the language used to represent the value of this element is signalled using the builtin XML attribute 'xml:lang'. See section 7, Multi-language support.<br><br>Contains the following attribute: languageSDPTag | string |
| languageSDPTag | A | NM/ TO | 0..1 | Identifier of the audio language described by the parent 'AudioLanguage' element as used in the media sections describing the audio track in a Session Description.<br><br>The 'languageSDPTag' may be formatted according to the rules of [RFC 3066], for the described language.<br><br>Each 'AudioLanguage' element declaring the same audio stream may have the same value of the 'languageSDPTag'. | String |

FIG. 10A

| TextLanguage | E1 | NM/ TM | 0..N | This element declares for the end user that the textual components of this service are available in the language represented by the value of this element. The textual components can be, for instance, a caption or a sub-title track.

The textual value of this element can be made available for the end users in different languages.

In such a case the language used to represent the value of this element is signaled using the builtin XML attribute 'xml:lang'. See section 7 Multilanguage support.

The same rules and constraints as specified for the element 'AudioLanguage' of assigning and interpreting the attributes 'languageSDPTag' and 'xml:lang' SHALL be applied for this element also.

Contains the following attribute: languageSDPTag | string |
|---|---|---|---|---|---|

| languageSDPTag | A | NM/ TO | 0..1 | Identifier of the text language described by the parent 'TextLanguage' element as used in the media sections describing the textual track in a string OMA-TS-BCAST_Service_Guide-V1_0_1-20130109-A Page 25 (232) Ó 2013 Open Mobile Alliance Ltd. All Rights Reserved.

Used with the permission of the Open Mobile Alliance Ltd. under the terms as stated in this document. [OMA-Template-Spec-20130101-I] Session Description. | String |
|---|---|---|---|---|---|

FIG. 10C

| Syntax | No. of Bits | Format |
|---|---|---|
| componentinfo_descriptor() { | | |
|     descriptor_tag | 8 | uimsbf |
|     descriptor_length | 8 | uimsbf |
|     num_components | 8 | uimsbf |
|     for(i=0;i<num_components;i++) { | | |
|     component_type | 3 | uimsbf |
|     component_role | 4 | uimsbf |
|     component_protected_flag | 1 | bslbf |
|     component_id | 8 | uimsbf |
|     component_name_length | 8 | uimsbf |
|     component_name_bytes() | var | |
|     } | | |
| } | | |

FIG. 13 A

| Syntax | No. of Bits | Format |
|---|---|---|
| componentinfo_descriptor() { | | |
|     descriptor_tag | 8 | uimsbf |
|     descriptor_length | 8 | uimsbf |
|     num_components | 8 | uimsbf |
|     for(i=0;i<num_components;i++) { | | |
|     component_type | 3 | uimsbf |
|     component_role | 4 | uimsbf |
|     component_protected_flag | 1 | bslbf |
|     component_id | 8 | uimsbf |
|     } | | |
| } | | |

FIG. 13 B

| Syntax | No. of Bits | Format |
|---|---|---|
| channel_descriptor() { | | |
|     descriptor_tag | 8 | uimsbf |
|     descriptor_length | 8 | uimsbf |
|     major_channel_num | 16 | uimsbf |
|     minor_channel_num | 16 | uimsbf |
|     service_lang_code | 24 | uimsbf |
|     service_genre_code | 8 | uimsbf |
|     service_descr_length | 8 | uimsbf |
|     service_descr_bytes() | var | |
|     icon_url_length | 8 | uimsbf |
|     icon_url_bytes() | var | |
| } | | |

FIG. 14 A

| Syntax | No. of Bits | Format |
|---|---|---|
| channel_descriptor() { | | |
|     descriptor_tag | 8 | uimsbf |
|     descriptor_length | 8 | uimsbf |
|     major_channel_num | 16 | uimsbf |
|     minor_channel_num | 15 | uimsbf |
|     ext_channel_info_present_flag | 1 | bslbf |
|     if (ext_channel_info_present_flag) { | | |
|     service_lang_code | 24 | uimsbf |
|     service_genre_code | 8 | uimsbf |
|     service_descr_length | 8 | uimsbf |
|     service_descr_bytes() | var | |
|     icon_url_length | 8 | uimsbf |
|     icon_url_bytes() | var | |
|     } | | |
| } | | |

FIG. 14 B

| Element or Attribute (@) Name | Cardinality | Data Type | Description |
|---|---|---|---|
| fichannel | | | Root element of the fast information channel information or user service bundle description |
| Service | 1...N | | ATSC service description |
|   ComponentInfo | 1...N | | Contains information about components available in the service. For each component includes information about component type, component role, component name, component identifier, component protection flag. |
|     @componentType | 1 | unsignedByte | Attribute indicates the type of this component. Value of 0 indicates an audio component. Value of 1 indicates a video component. Value of 2 indicated a closed caption component. Value of 3 indicates an application component. Values 4 to 7 are reserved. |
|     @componentRole | 1 | unsignedByte | Attribute indicates the role or kind of this component. For audio (when componentType attribute above is equal to 0): values of componentRole attribute are as follows: 0 = Complete main, 1 = Music and Effects, 2 = Dialog, 3 = Commentary, 4 = Visually Impaired, 5 = Hearing Impaired, 6 = Voice-Over, 7-254= reserved, 255 = unknown. For Video (when componentType attribute above is equal to 1) values of componentRole attribute are as follows: 0 = Primary video, 1= Alternative camera view, 2 = Other alternative video component, 3 = Sign language inset, 4 = Follow subject video, 5 = 3D video left view, 6 = 3D video right view, 7 = 3D video depth information, 8 = Part of video array <x,y> of <n,m>, 9 = Follow-Subject metadata, 10-254 = reserved, 255 = unknown. For Closed Caption component (when componentType attribute above is equal to 2) values of componentRole attribute are as follows: 0 = Normal, 1 = Easy reader, 2-254 = reserved, 255 = unknown. When componentType attribute above is between 3 to 7, inclusive, the componentRole shall be equal to 255. |
|     @componentProtectedFlag | 0..1 | boolean | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
|     @componentId | 1 | unsignedByte | Attribute indicates the identifier of this component. The componentId shall be unique within the service. |
|     @componentName | 0..1 | String | Attribute indicates the human readable name of this component. |

FIG. 15

| Element or Attribute (@) Name | Cardinality | Data Type | Description |
|---|---|---|---|
| fichannel | | | Root element of the fast information channel information or user service bundle description |
| Service | 1..N | | ATSC service description |
|   Channel | 1 | | Contains information about the channel in the service (or about this service). |
|     @majorChannelNo | 1 | unsignedShort | Attribute indicates the major channel number of the service. |
|     @minorChannelNo | 1 | unsignedShort | Attribute indicates the minor channel number of the service. |
|     @serviceLang | 0..1 | String | Attribute indicates the primary language used in the service. Semantics of xml:lang shall be followed. |
|     @serviceGenre | 0..1 | unsignedByte | Attribute indicates primary genre of the service. This attribute shall be instantiated to describe the genre category for the service. The <classificationSchemeURI> is http://www.atsc.org/XMLSchemas/mh/2009/1.0/genre-cs/ and the value of serviceGenre shall match a termID value from the classification schema in Annex B of A/153 Part 4 document titled "ATSC-Mobile DTV Standard, Part 4 – Announcement" available at http://www.atsc.org which is incorporated in its entirety here by reference. |
|     @serviceIcon | 1 | anyURI | Attribute indicates the Uniform Resource Locator (URL) for the icon used to represent this service. |
|     ServiceDescription | 0..N | | Contains service description possibly in multiple languages. |
|       @serviceDescrText | 1 | String | Attribute indicates description of the service. |
|       @serviceDescrLang | 0..1 | String | Attribute indicates the language of the serviceDescrText. Semantics of xml:lang shall be followed. |

FIG. 16

```
<xs:schema xmlns:xs="http://www.w3.org/2001/XMLSchema" >
<xs:element name="ComponentInfo" minOccurs="0" maxOccurs="unbounded">
    <xs:complexType>
            <xs:attribute name="componentType" type="xs:unsignedByte" use="required"/>
            <xs:attribute name="componentRole" type="xs:unsignedByte" use="required"/>
            <xs:attribute name="componentProtectedFlag" type="xs:boolean" use="optional"/>
            <xs:attribute name="componentId" type="xs:unsignedByte" use="required"/>
            <xs:attribute name="componentName" type="xs:string" use="optional"/>
    </xs:complexType>
</xs:element>
</xs:schema>
```

FIG. 17

```
<xs:schema xmlns:xs="http://www.w3.org/2001/XMLSchema" >
    <xs:element name="Channel">
        <xs:complexType>
            <xs:simplecontent>
                <xs:attribute name="majorChannelNo" type="xs:unsignedByte" use="required"/>
                <xs:attribute name="minorChannelNo" type="xs:unsignedByte" use="required"/>
                <xs:attribute name="serviceLang" type="xs:string" use="optional"/>
                <xs:attribute name="serviceLang" type="xs:string" use="optional"/>
                <xs:attribute name="serviceGenre" type="xs:unsignedByte" use="optional"/>
                <xs:attribute name="serviceIcon" type="xs:anyURI" use="required"/>
                <xs:attribute name="serviceLang" type="xs:string" use="optional"/>
            </xs:simplecontent>
            <xs:element name="ServiceDescription" type="ServiceDescriptionType" minOccurs="1" maxOccurs="unbounded"/>
        </xs:complexType>
    </xs:element>

<xs:complexType name="ServiceDescriptionType">
        <xs:attribute name="serviceDescrText" type="xs:string" use="required"/>
        <xs:attribute name="serviceDescrLang" type="xs:string" use="optional"/>
    </xs:complexType>
</xs:schema>
```

FIG. 18

METHOD FOR DECODING A SERVICE GUIDE

TECHNICAL FIELD

The present disclosure relates generally to a service guide.

BACKGROUND ART

A broadcast service is capable of being received by all users having broadcast receivers. Broadcast services can be roughly divided into two categories, namely, a radio broadcast service carrying only audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using both a cable network, Internet, and/or a satellite) provide high quality audio and video broadcast services along with a high-speed data service. Also, broadcast services include sending and/or receiving audio, video, and/or data directed to an individual computer and/or group of computers and/or one or more mobile communication devices.

In addition to more traditional stationary receiving devices, mobile communication devices are likewise configured to support such services. Such configured mobile devices have facilitated users to use such services while on the move, such as mobile phones. An increasing need for multimedia services has resulted in various wireless/broadcast services for both mobile communications and general wire communications. Further, this convergence has merged the environment for different wire and wireless broadcast services.

SUMMARY OF INVENTION

Technical Problem

Open Mobile Alliance (OMA), is a standard for interworking between individual mobile solutions, serves to define various application standards for mobile software and Internet services. OMA Mobile Broadcast Services Enabler Suite (OMA BCAST) is a specification designed to support mobile broadcast technologies. The OMA BCAST defines technologies that provide IP-based mobile content delivery, which includes a variety of functions such as a service guide, downloading and streaming, service and content protection, service subscription, and roaming.

Solution to Problem

According to the present invention, there is provided a method for decoding a service guide by a decoder associated with a service comprising a media bitstream comprising:
(a) receiving a service description within said service guide by said decoder;
(b) receiving a service media extension within said service description by said decoder;
(c) receiving a major channel number within said service media extension by said decoder;
(d) receiving a minor channel number within said service media extension by said decoder;
(e) receiving an icon within said service media extension by said decoder;
(f) decoding said service guide by said decoder including said service media extension, said major channel number, said minor channel number, and said icon.

Advantageous Effects of Invention

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 3 is a block diagram illustrating a principle of the conventional service guide delivery method.

FIG. 4 illustrates description scheme.

FIG. 5 illustrates a ServiceMediaExtension with MajorChannelNum and MinorChannelNum.

FIG. 6 illustrates a ServiceMediaExtension with an Icon.

FIG. 7 illustrates a ServiceMediaExtension with a url.

FIG. 8 illustrates a ServiceMediaExtension with MajorChannelNum, MinorChannelNum, Icon, and url.

FIG. 9A illustrates AudioLanguage elements and TextLanguage elements.

FIG. 9B illustrates AudioLanguage elements and TextLanguage elements.

FIG. 9C illustrates AudioLanguage elements and TextLanguage elements.

FIG. 10A illustrates AudioLanguage elements and TextLanguage elements.

FIG. 10B illustrates AudioLanguage elements and TextLanguage elements.

FIG. 10C illustrates AudioLanguage elements and TextLanguage elements.

FIG. 13A illustrates a binary syntax for a component information descriptor.

FIG. 13B illustrates a binary syntax for a component information descriptor.

FIG. 14A illustrates a binary syntax for a channel information descriptor.

FIG. 14B illustrates a binary syntax for a channel information descriptor.

FIG. 15 illustrates a XML syntax and semantics for a component information descriptor.

FIG. 16 illustrates a XML syntax and semantics for a channel information descriptor.

FIG. 17 illustrates a XML schema for a component information descriptor.

FIG. 18 illustrates a XML schema for a channel information descriptor.

DESCRIPTION OF EMBODIMENTS

Figure 1:
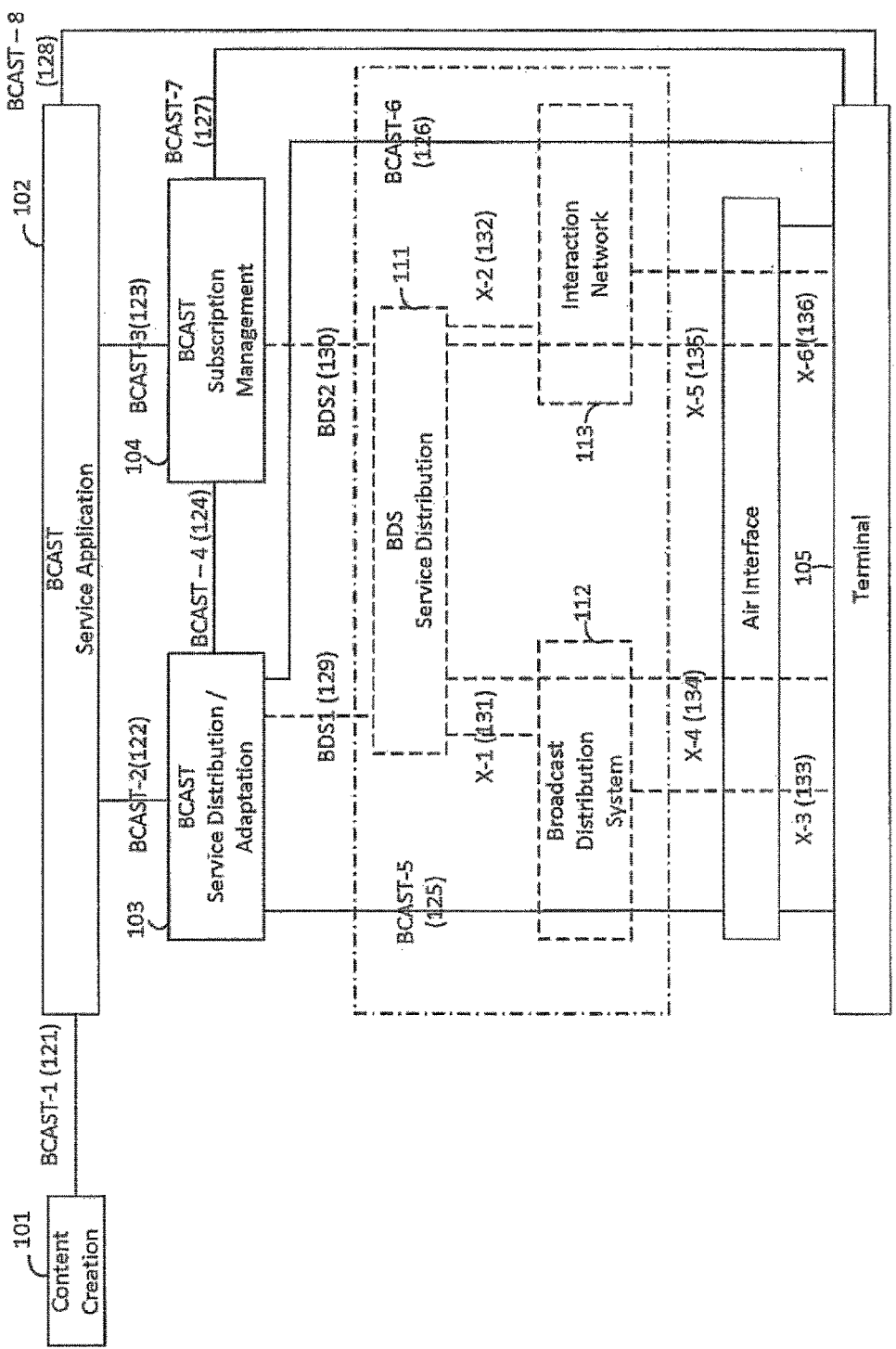
FIG. 1 is a block diagram illustrating logical architecture of a BCAST system specified by OMA BCAST working group in an application layer and a transport layer.

Referring to FIG. 1, a logical architecture of a broadcast system specified by OMA (Open Mobile Alliance) BCAST may include an application layer and a transport layer. The logical architecture of the BCAST system may include a Content Creation (CC) 101, a BCAST Service Application 102, a BCAST Service Distribution/Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured, as desired. It is to be understood that the broadcast system and/or receiver system may include additional elements and/or fewer elements, as desired.

In general, the Content Creation (CC) 101 may provide content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file/streaming delivery, service gathering, service protection, service guide creation/delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content/service guide and program support information, such as content protection, and provides a broadcast service to a user. The BDS Service Distribution 111 delivers mobile broadcast services to a plurality of terminals through mutual communication with the BDS 112 and the Interaction Network 113.

In general, the BDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, may have a plurality of interfaces, as desired. The interfaces are used for communication between two or more logical entities for their specific purposes. A message format, a protocol and the like are applied for the interfaces. In some embodiments, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference/subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and all data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and all data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Figure 2:
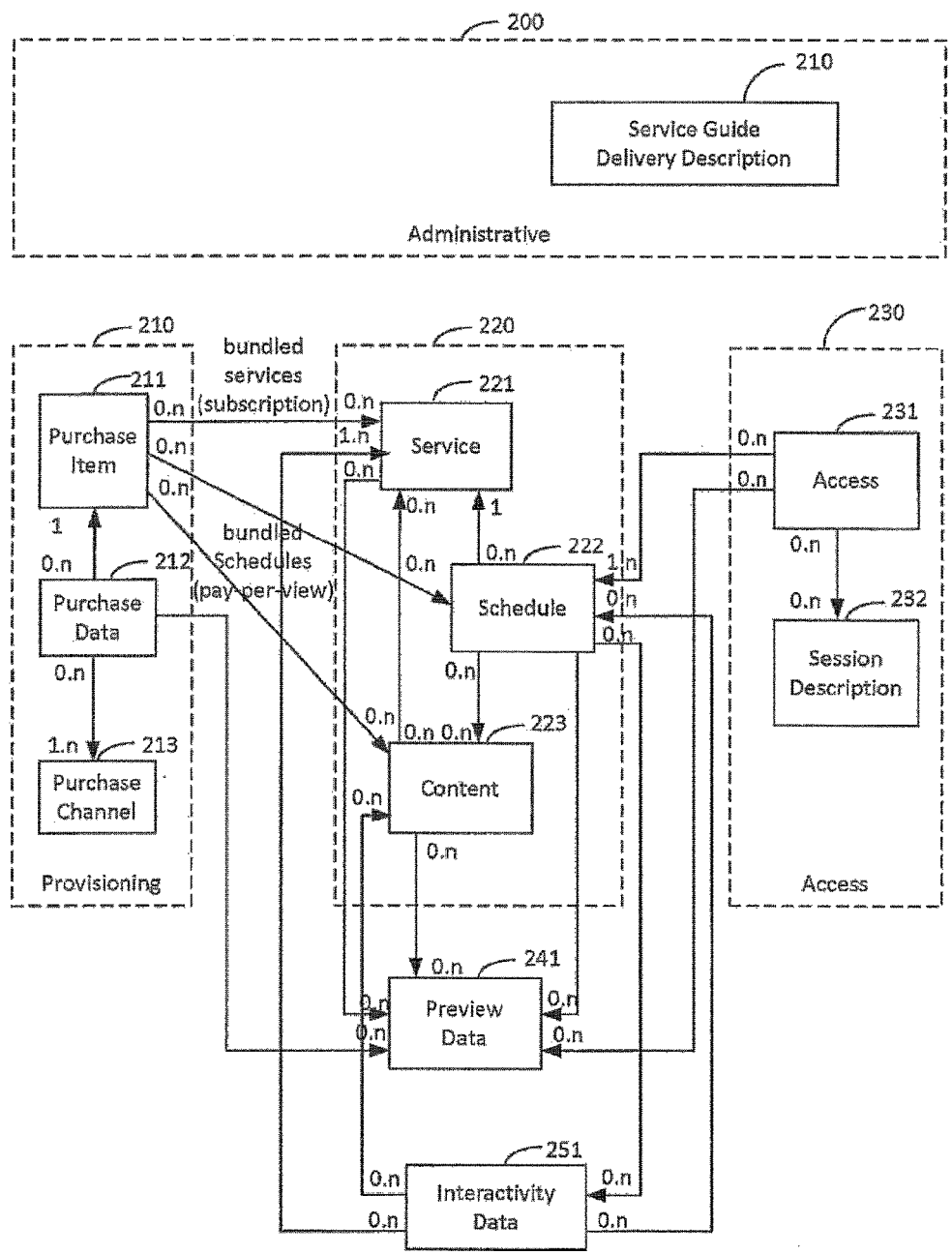
FIG. 2 is a diagram illustrating a structure of a service guide for use in the OMA BCAST system.

Referring to FIG. 2, an exemplary service guide for the OMA BCAST system is illustrated. For purposes of illustration, the solid arrows between fragments indicate the reference directions between the fragments. It is to be understood that the service guide system may be reconfigured, as desired. It is to be understood that the service guide system may include additional elements and/or fewer elements, as desired. It is to be understood that functionality of the elements may be modified and/or combined, as desired.

Figure 2A:
FIG. 2A is a diagram showing cardinalities and reference direction between service guide fragments.

FIG. 2A is a diagram showing cardinalities and reference direction between service guide fragments. The meaning of the cardinalities shown in the FIG. 2 is the following: One instantiation of Fragment A as in FIG. 2A references c to d instantiations of Fragment B. If c=d, d is omitted. Thus, if c>0 and Fragment A exists, at least c instantiation of Fragment B must also exist, but at most d instantiations of Fragment B may exist. Vice versa, one instantiation of Fragment B is referenced by a to b instantiations of Fragment A. If a=b, b is omitted. The arrow connection from Fragment A pointing to Fragment B indicates that Fragment A contains the reference to Fragment B.

With respect to FIG. 2, in general, the service guide may include an Administrative Group 200 for providing basic information about the entire service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) block 201. The Provision Group 210 may include a Purchase Item block 211, a Purchase Data block 212, and a Purchase Channel block 213. The Core Group 220 may include a Service block 221, a Schedule block 222, and a Content block 223. The Access Group 230 may include an Access block 231 and a Session Description block 232.

The service guide may further include Preview Data 241 and Interactivity Data 251 in addition to the four information groups 200, 210, 220, and 230.

The aforementioned components may be referred to as basic units or fragments constituting aspects of the service guide, for purposes of identification.

The SGDD fragment 201 may provide information about a delivery session where a Service Guide Delivery Unit (SGDU) is located. The SGDU is a container that contains service guide fragments 211, 212, 213, 221, 222, 223, 231, 232, 241, and 251, which constitute the service guide. The SGDD may also provide the information on the entry points for receiving the grouping information and notification messages.

The Service fragment 221, which is an upper aggregate of the content included in the broadcast service, may include information on service content, genre, service location, etc. In general, the 'Service' fragment describes at an aggregate level the content items which comprise a broadcast service. The service may be delivered to the user using multiple means of access, for example, the broadcast channel and the interactive channel. The service may be targeted at a certain user group or geographical area. Depending on the type of the service it may have interactive part(s), broadcast-only part(s), or both. Further, the service may include components not directly related to the content but to the functionality of the service such as purchasing or subscription information. As the part of the Service Guide, the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of each of these fragments. Together with the associated fragments the terminal may determine the details associated with the service at any point of time. These details may be summarized into a user-friendly display, for example, of what, how and when the associated content may be consumed and at what cost.

The Access fragment 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are required from the terminal to receive and render the service. The 'Access' fragment provides Session Description parameters either in the form of inline text, or through a pointer in the form of a URI to a separate Session Description. Session Description information may be delivered over either the broadcast channel or the interaction channel.

The Session Description fragment 232 may be included in the Access fragment 231, and may provide location information in a Uniform Resource Identifier (URI) form so that the terminal may detect information on the Session Description fragment 232. The Session Description fragment 232 may provide address information, codec information, etc., about multimedia content existing in the session. As such, the 'SessionDescription' is a Service Guide fragment which provides the session information for access to a service or content item. Further, the Session Description may provide auxiliary description information, used for associated delivery procedures. The Session Description information is provided using either syntax of SDP in text format, or through a 3GPP MBMS User Service Bundle Description [3GPP TS 26.346] (USBD). Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used both for Service Guide delivery itself as well as for the content sessions.

The Purchase Item fragment 211 may provide a bundle of service, content, time, etc., to help the user subscribe to or purchase the Purchase Item fragment 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a single content file related to a service, (4) other 'PurchaseItem' fragments to enable bundling of purchase items.

The Purchase Data fragment 212 may include detailed purchase and subscription information, such as price information and promotion information, for the service or content bundle. The Purchase Channel fragment 213 may provide access information for subscription or purchase. As such, the main function of the 'PurchaseData' fragment is to express all the available pricing information about the associated purchase item. The 'PurchaseData' fragment collects the information about one or several purchase channels and may be associated with PreviewData specific to a certain service or service bundle. It carries information about pricing of a service, a service bundle, or, a content item. Also, information about promotional activities may be included in this fragment. The SGDD may also provide information regarding entry points for receiving the service guide and grouping information about the SGDU as the container.

The Preview Data fragment 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data fragment 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during TV shows or to obtain content related to the broadcast content. 'InteractivityData' fragment points to one or many 'InteractivityMedia' documents that include xhtml files, static images, email template, SMS template, MMS template documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming, downloading and/or rendering. This fragment references the 'Service' fragment. If it also references one or more 'Content' fragments or 'InterativityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or 'InteractivityData' fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (BSMs). The terminal is only permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. his/her mobile operator) to which all purchase requests should be directed. The preferred purchase channel may even be the only channel that an end-user is allowed to use.

The ServiceGuideDeliveryDescriptor is transported on the Service Guide Announcement Channel, and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel. The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are still valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted, as desired. Also, one or more fragments of the service guide may be combined, as desired. Also, different aspects of one or more fragments of the service guide may be combined together, reorganized, and otherwise modified, or constrained as desired.

Referring to FIG. 3, an exemplary block diagram illustrates aspects of a service guide delivery technique. The Service Guide Deliver Descriptor fragment 201 may include the session information, grouping information, and notification message access information related to all fragments containing service information. When the mobile broadcast service-enabled terminal 105 turns on or begins to receive the service guide, it may access a Service Guide Announcement Channel (SG Announcement Channel) 300.

The SG Announcement Channel 300 may include at least one of SGDD 200 (e.g., SGDD #1, . . . , SGDD #2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance, Version 1.1, Oct. 29, 3013; both of which are incorporated by reference in their entirety. The descriptions of elements and attributes constituting the Service Guide Delivery Descriptor fragment 201 may be reflected in any suitable format, such as for example, a table format and/or in an eXtensible Markup Language (XML) schema.

The actual data is preferably provided in XML format according to the SGDD fragment 201. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the SG Announcement Channel 300.

The DescriptorEntry 302, which may provide the grouping information of a Service Guide includes the "GroupingCriteria", "ServiceGuideDeliveryUnit", "Transport", and "AlternativeAccessURI". The transport-related channel information may be provided by the "Transport" or "AlternativeAccessURI", and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present all of the SGDUs 312 to the user according to the corresponding group information.

Once the transport information is acquired, the terminal 105 may access all of the Delivery Channels acquired from a DescriptorEntry 302 in an SGDD 301 on an SG Delivery Channel 310 to receive the actual SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly, the terminal 105 can selectively access the channels and receive all the SGDUs existing on the corresponding channels. Once the entire SGDU is completely received on the SG Delivery Channels 310, the terminal 105 checks all the fragments contained in the SGDUs received on the SG Delivery Channels 310 and assembles the fragments to display an actual full service guide 320 on the screen which can be subdivided on an hourly basis 321.

In the conventional mobile broadcast system, the service guide is formatted and transmitted such that only configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission/reception systems may be described using terms of entities defined in the 3GPP standards and OMA BCAST standards (e.g., a scheme). However, the service guide/reception systems may be used with any suitable communication and/or broadcast system.

Referring to FIG. 4, the scheme may include, for example, (1) Name; (2) Type; (3) Category; (4) Cardinality; (5) Description; and (6) Data type. The scheme may be arranged in any manner, such as a table format of an XML format.

The "name" column indicates the name of an element or an attribute. The "type" column indicates an index representing an element or an attribute. An element can be one of E1, E2, E3, E4, . . . , E[n]. E1 indicates an upper element of an entire message, E2 indicates an element below the E1, E3 indicates an element below E2, E4 indicates an element below the E3, and so forth. An attribute is indicated by A. For example, an "A" below E1 means an attribute of element E1. In some cases the notation may mean the following E=Element, A=Attribute, E1=sub-element, E2=sub-element's sub-element, E[n]=sub-element of element[n−1]. The "category" column is used to indicate whether the element or attribute is mandatory. If an element is mandatory, the category of the element is flagged with an "M". If an element is optional, the category of the element is flagged with an "O". If the element is optional for network to support it the element is flagged with a "NO". If the element is mandatory for terminal to support it is flagged with a TM. If the element is mandatory for network to support it the element is flagged with "NM". If the element is optional for terminal to support it the element is flagged with "TO". If an element or attribute has cardinality greater than zero, it is classified as M or NM to maintain consistency. The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

A service may represent a bundle of content items, which forms a logical group to the end-user. An example would be a TV channel, composed of several TV shows. A 'Service' fragment contains the metadata describing the Mobile Broadcast service. It is possible that the same metadata (i.e., attributes and elements) exist in the 'Content' fragment(s) associated with that 'Service' fragment. In that situation, for the following elements: 'ParentalRating', 'TargetUserProfile', 'Genre' and 'BroadcastArea', the values defined in 'Content' fragment take precedence over those in 'Service' fragment.

The program guide elements of this fragment may be grouped between the Start of program guide and end of program guide cells in a fragment. This localization of the elements of the program guide reduces the computational complexity of the receiving device in arranging a programming guide. The program guide elements are generally used for user interpretation. This enables the content creator to provide user readable information about the service. The terminal should use all declared program guide elements in this fragment for presentation to the end-user. The terminal may offer search, sort, etc. functionalities. The Program Guide may consist of the following service elements: (1) Name; (2) Description; (3) AudioLanguage; (4) TextLanguage; (5) ParentalRating; (6) TargetUserProfile; and (7) Genre.

The "Name" element may refer to Name of the Service, possibly in multiple languages. The language may be expressed using built-in XML attribute 'xml:lang'.

The "Description" element may be in multiple languages and may be expressed using built-in XML attribute 'xml:lang'.

The "AudioLanguage" element may declare for the end users that this service is available with an audio track corresponding to the language represented by the value of this element. The textual value of this element can be made available for the end users in different languages. In such a case the language used to represent the value of this element may be signaled using the built-in XML attribute 'xml:lang', and may include multi-language support. The AudioLanguage may contain an attribute languageSDPTag.

The "languageSDPTag" attribute is an identifier of the audio language described by the parent 'AudioLanguage' element as used in the media sections describing the audio track in a Session Description. Each 'AudioLanguage' element declaring the same audio stream may have the same value of the 'languageSDPTag'.

The "TextLanguage" element may declare for the end user that the textual components of this service are available in the language represented by the value of this element. The textual components can be, for instance, a caption or a sub-title track. The textual value of this element can be made available for the end users in different languages. In such a case the language used to represent the value of this element may be signaled using the built-in XML attribute 'xml:lang', and may include multi-language support. The same rules and constraints as specified for the element 'AudioLanguage' of assigning and interpreting the attributes 'languageSDPTag' and 'xml:lang' may be applied for this element.

The "languageSDPTag" attribute is an identifier of the text language described by the parent 'TextLanguage' element as used in the media sections describing the textual track in a Session Description.

The "ParentalRating" element may declare criteria parents and might be used to determine whether the associated item is suitable for access by children, defined according to the regulatory requirements of the service area. The terminal may support 'ParentalRating' being a free string, and the terminal may support the structured way to express the parental rating level by using the 'ratingSystem' and 'ratingValueName' attributes.

The "ratingSystem" attribute may specify the parental rating system in use, in which context the value of the 'ParentalRating' element is semantically defined. This allows terminals to identify the rating system in use in a non-ambiguous manner and act appropriately. This attribute may be instantiated when a rating system is used. Absence of this attribute means that no rating system is used (i.e. the value of the 'ParentalRating' element is to be interpreted as a free string).

The "ratingValueName" attribute may specify the human-readable name of the rating value given by this ParentalRating element.

The "TargetUserProfile" may specify elements of the users whom the service is targeting at. The detailed personal attribute names and the corresponding values are specified by attributes of 'attributeName' an 'attributeValue'. Amongst the possible profile attribute names are age, gender, occupation, etc. (subject to national/local rules & regulations, if present and as applicable regarding use of personal profiling information and personal data privacy). The extensible list of 'attributeName' and 'attributeValue' pairs for a particular service enables end user profile filtering and end user preference filtering of broadcast services. The terminal may be able to support 'TargetUserProfile' element. The use of 'TargetUserProfile' element may be an "opt-in" capability for users. Terminal settings may allow users to configure whether to input their personal profile or preference and whether to allow broadcast service to be automatically filtered based on the users' personal attributes without users' request. This element may contain the following attributes: attributeName and attributeValue.

The "attributeName" attribute may be a profile attribute name.

The "attributeValue" attribute may be a profile attribute value.

The "Genre" element may specify classification of service associated with characteristic form (e.g. comedy, drama). The OMA BCAST Service Guide may allow describing the format of the Genre element in the Service Guide in two ways. The first way is to use a free string. The second way is to use the "href" attributes of the Genre element to convey the information in the form of a controlled vocabulary (classification scheme as defined in [TVA-Metadata] or classification list as defined in [MIGFG]). The built-in XML attribute xml:lang may be used with this element to express the language. The network may instantiate several different sets of 'Genre' element, using it as a free string or with a 'href' attribute. The network may ensure the different sets have equivalent and nonconflicting meaning, and the terminal may select one of the sets to interpret for the end-user. The 'Genre' element may contain the following attributes: type and href.

The "type" attribute may signal the level of the 'Genre' element, such as with the values of "main", "second", and "other".

The "href" attribute may signal the controlled vocabulary used in the 'Genre' element.

After reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information defined within the programming guide to appropriately render the information in a manner suitable for the viewer. In particular, the traditional NTSC television stations typically have numbers such as, 2, 4, 6, 8, 12, and 49. For digital services, program and system information protocol includes a virtual channel table that, for terrestrial broadcasting defines each digital television service with a two-part number consisting of a major channel followed by a minor channel. The major channel number is usually the same as the NTSC channel for the station, and the minor channels have numbers depending on how many digital television services are present in the digital television multiples, typically starting at 1. For example, the analog television channel 9, WUSA-TV in Washington, D.C., may identify its two over-the-air digital services as follows: channel 9-1 WUSA-DT and channel 9-2 9-Radar. This notation for television channels is readily understandable by a viewer, and the programming guide elements may include this capability as an extension to the programming guide so that the information may be computationally efficiently processed by the receiving device and rendered to the viewer.

Referring to FIG. 5, to facilitate this flexibility an extension, such as ServiceMediaExtension, may be included with the programming guide elements which may specify further services. In particular, the ServiceMediaExtension may have a type element E1, a category NM/TM, with a cardinality of 1. The major channel may be referred to as MajorChannelNum, with a type element E2, a category NM/TM, a cardinality of 0 . . . 1, and a data type of string. By including the data type of string, rather than an unsignedByte, permits the support of other languages which may not necessarily be a number. The program guide information, including the ServiceMediaExtension may be included in any suitable broadcasting system, such as for example, ATSC.

After further reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information suitable to appropriately rendering the information in a manner suitable for the viewer. In many cases, the viewer associates a graphical icon with a particular program and/or channel and/or service. In this manner, the graphical icon should be selectable by the system, rather than being non-selectable.

Referring to FIG. 6, to facilitate this flexibility an extension may be included with the programming guide elements which may specify an icon.

After yet further reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information suitable to appropriately rendering the information in a manner suitable for the viewer. In many cases, the viewer may seek to identify the particular extension being identified using the same extension elements. In this manner, a url may be used to specifically identify the particular description of the elements of the extension. In this manner, the elements of the extension may be modified in a suitable manner without having to expressly describe multiple different extensions.

Referring to FIG. 7, to facilitate this flexibility an extension may be included with the programming guide elements which may specify a url.

Referring to FIG. 8, to facilitate this overall extension flexibility an extension may be included with the programming guide elements which may specify an icon, major channel number, minor channel number, and/or url.

In other embodiments, instead of using Data Type "string" for MajorChannelNum and MinorChannelNum elements, other data types may be used. For example, the data type unsignedInt may be used. In another example, a string of limited length may be used, e.g. string of 10 digits. An exemplary XML schema syntax for the above extensions is illustrated below.

```
<xs:element name="ServiceMediaExtension " type="SerExtensionType"
minOccurs="0" maxOccurs="unbounded"/>
<xs:complexType name="SerExtensionType">
    <xs:sequence>
        <xs:element name="Icon" type="xs:anyURI" minOccurs="0"
        maxOccurs="unbounded"/>
        <xs:element name="MajorChannelNum"
        type="LanguageString"
        minOccurs="0" maxOccurs="1"/>
        <xs:element name="MinorChannelNum"
        type="LanguageString"
        minOccurs="0" maxOccurs="1"/>
    </xs:sequence>
    <xs:attribute name="url" type="xs:anyURI" use="required"/>
</xs:complexType>
```

In some embodiments the ServiceMediaExtension may be included inside a OMA "extension" element or may in general use OMA extension mechanism for defining the ServiceMediaExtension.

In some embodiments the MajorChannelNum and MinorChannelNum may be combined into one common channel number and represented. For example a ChannelNum string may be created by concatenating MajorChannelNum followed by a period ('.') followed by MinorChannelNum. Other such combinations are also possible with period replaced by other characters. Similar concept can be applied when using unsignedInt or other data types to represent channel numbers in terms of combining MajorChannelNum and MinorChannelNum into one number representation.

In yet another embodiment a MajorChannelNum.MinorChannelNum could be represented as "ServiceId" element (Service Id) for the service.

In another embodiment, the ServiceMediaExtension shall only be used inside a PrivateExt element within a Service fragment An exemplary XML schema syntax for such an extension is illustrated below.

```
<element name=" ServiceMediaExtension " type=" SerExtensionType ">
    <annotation>
        <documentation>
```

This element is a wrapper for extensions to OMA BCAST SG Service fragments. It shall only be used inside a PrivateExt element within a Service fragment.

```
        </documentation>
    </annotation>
</element>
<xs:complexType name="SerExtensionType">
    <xs:sequence>
        <xs:element name="Icon" type="xs:anyURI" minOccurs="0"
        maxOccurs="unbounded"/>
        <xs:element name="MajorChannelNum"
        type="LanguageString"
        minOccurs="0" maxOccurs="1"/>
        <xs:element name="MinorChannelNum"
        type="LanguageString"
        minOccurs="0" maxOccurs="1"/>
    </xs:sequence>
    <xs:attribute name="url" type="xs:anyURI" use="required"/>
</xs:complexType>
```

In other embodiments some of the elements above may be changed from E2 to E1. In other embodiments the cardinality of some of the elements may be changed. In addition, if desired, the category may be omitted since it is generally duplicative of the information included with the cardinality.

It is desirable to map selected components of the ATSC service elements and attributes to the OMA service guide service fragment program guide. For example, the "Description" attribute of the OMA service guide fragment program guide may be mapped to "Description" of the ATSC service elements and attributes, such as for example ATSC-Mobile DTV Standard, Part 4—Announcement, other similar broadcast or mobile standards for similar elements and attributes. For example, the "Genre" attribute of the OMA service guide fragment program guide may be mapped to "Genre" of the ATSC service elements and attributes, such as for example ATSC-Mobile DTV Standard, Part 4—Announcement, other similar standards for similar elements and attributes. In one embodiment Genre scheme as defined in Section 6.10.2 of ATSC A153/Part 4 may be utilized For example, the "Name" attribute of the OMA service guide fragment program guide may be mapped to "Name" of the ATSC service elements and attributes, such as for example ATSC-Mobile DTV Standard, Part 4—Announcement, other similar standards for similar elements and attributes. Preferably, the cardinality of the name is selected to be 0 . . . N, which permits the omission of the name which reduces the overall bit rate of the system and increase flexibility. For example, the "ParentalRating" attribute of the OMA service guide fragment program guide may be mapped to a new "ContentAdvisory" of the ATSC service element and attributes, such as for example ATSC-Mobile DTV Standard, Part 4—Announcement, or similar standards for similar elements and attributes. For example, the "TargetUserProfile" attribute of the OMA service guide fragment program guide may be mapped to a new "Personalization" of the ATSC service element and attributes, such as for example ATSC-Mobile DTV Standard, Part 4—Announcement, or similar standards for similar elements and attributes.

Referring to FIGS. 9A, 9B, 9C, the elements AudioLanguage (with attribute languageSDPTag) and TextLanguage (with attribute languageSDPTag) could be included if Session Description Fragment is included in the service announcement, such as for example ATSC-Mobile DTV Standard, Part 4—Announcement, or similar standards for similar elements and attributes. This is because the attribute languageSDPTag for the elements AudioLanguage and TextLanguage are preferably mandatory. This attribute provides identifier for audio/text language described by the parent element as used in the media sections describing audio/text track in a session description. In another embodiment the attribute languageSDPTag could be made optional and the elements AudioLanguage and TextLanguage could be included with an attribute "Language" with data type "string" which can provide language name.

An example XML schema syntax for this is shown below.

```
<xs:complexType name="AudioOrTextLanguageType">
    <xs:simpleContent>
        <xs:extension base="LanguageString">
            <xs:attribute name="languageSDPTag" type="xs:string"
use= "optional"/>
            <xs:attribute name="language" type="xs:string"
            use="required"/>
        </xs:extension>
    </xs:simpleContent>
</xs:complexType>
```

In another embodiment the attributes languageSDPTag for the elements AudioLanguage and TextLanguage could be removed. An example XML schema syntax for this is shown below.

```
<xs:complexType name="AudioOrTextLanguageType">
    <xs:simpleContent>
        <xs:extension base="LanguageString">
            <xs:attribute name="language" type="xs:string"
                use="required"/>
        </xs:extension>
    </xs:simpleContent>
</xs:complexType>
```

Referring to FIGS. 10A, 10B, 10C, the elements AudioLanguage (with attribute languageSDPTag) and TextLanguage (with attribute languageSDPTag) could be included if Session Description Fragment is included in the service announcement, such as for example ATSC-Mobile DTV Standard, Part 4—Announcement, or similar standards for similar elements and attributes. This is because the attribute languageSDPTag for the elements AudioLanguage and TextLanguage are preferably mandatory. This attribute provides identifier for audio/text language described by the parent element as used in the media sections describing audio/text track in a session description. In another embodiment the attribute languageSDPTag could be made optional.

An example XML schema syntax for this is shown below.

```
<xs:complexType name="AudioOrTextLanguageType">
    <xs:simpleContent>
        <xs:extension base="LanguageString">
            <xs:attribute name="languageSDPTag" type="xs:string"
use= "optional"/>
        </xs:extension>
    </xs:simpleContent>
</xs:complexType>
```

In another embodiment the attributes languageSDPTag for the elements AudioLanguage and TextLanguage could be removed. An example XML schema syntax for this is shown below.

```
<xs:complexType name="AudioOrTextLanguageType">
    <xs:simpleContent>
        <xs:extension base="LanguageString">
        </xs:extension>
    </xs:simpleContent>
</xs:complexType>
```

In another embodiment the attribute "language" could be mapped to ATSC service "language" element and could refer to the primary language of the service.

In another embodiment the value of element "AudioLanguage" could be mapped to ATSC service "language" element and could refer to the primary language of the audio service in ATSC.

In another embodiment the value of element "TextLanguage" could be mapped to ATSC service "language" element and could refer to the primary language of the text service in ATSC. In some cases the text service may be a service such as closed caption service. In another embodiment the elements AudioLanguage and TextLanguage and their attributes could be removed.

For the service guide, traditionally the consideration has been to reference the linear stream of the audio-visual content, generally referred to as a "linear service". With the proliferation of applications also referred to as "apps" it is desirable to reference app-based (i.e. application based) services which are other programs that are executed and provide a service to the user, generally referred to as "app-based service". It is desirable to map notification stream of the "linear service" or the "app-based service" using the Notification ServiceType element 7 of the OMA service guide fragment program guide.

It is also desirable to enable the notification of other services using the ServiceType element of the OMA service guide fragment program guide. The ServiceType may use the range "reserved for proprietary use" to include additional service types. For example, ServiceType element value 224 may be used to identify an "App-Based Service" that includes an application component to be used. For example, ServiceType element value 225 may be used to identify an "App-Based Service" that includes non-real time content to be used. For example, ServiceType element value 226 may be used for to identify an "App-Based Service" that includes an on-demand component to be used. In this manner, these app-based services are mapped to the Notification ServiceType element 7, and thus are readily omitted when the Notification ServiceType element 7 does not indicate their existence, thereby reducing the complexity of the bitstream.

In another embodiment, rather than mapping the notification to the value of 7 for OMA ServiceType, an additional ServiceType value may be defined. A Notification ServiceType element 227 of the OMA service guide fragment program guide may be used to identify an "App-Based Service" that includes an application component to be used including a notification stream component.

It is to be understood that other values may likewise be used for the described services. For example instead of service type values 224, 225, 226, and 227 above the service type values 240, 241, 242, 243 may be used. In yet another case the service type values 129, 130, 131, 132 may instead be used.

In yet another embodiment instead if using ServiceType values from the range (128-255) reserved for proprietary use, the values from the range (11-127) reserved for future use may be used.

In yet another embodiment when using OMA BCAST Guide 1.1 from instead if using ServiceType values from the range (128-255) reserved for proprietary use, the values from the range (14-127) reserved for future use may be used.

In yet another embodiment when using OMA BCAST Guide 1.1 from [instead if using ServiceType values from the range (128-255) reserved for proprietary use, the values from the range (128-223) reserved for other OMA enablers may be used.

In yet another embodiment when using OMA BCAST Guide 1.1 from instead if using ServiceType values from the range (128-255) reserved for proprietary use, the values may be restricted in the range (224-255) reserved for other OMA enablers may be used.

In another embodiment, for example, an additional ServiceType element value 228 may be used to identify a "Linear Service". For example, an additional ServiceType element value 229 may be used to identify an "App-Based Service" that includes a generalized application based enhancement. In this manner, the service labeling is simplified by not expressly including services type for application component, non-real time content, nor on-demand component.

In another embodiment, for example, an additional or alternative ServiceType element value 230 may be used for to identify an "App-Based Service" that includes an application based enhancement. In this manner, the notification is further simplified by not expressly including services type for linear service, application component, non-real time content, nor on-demand component.

In another embodiment, for example, the ServiceType element value 1 also may be used for to identify a "Linear Service". In this manner, the Linear Element is incorporated within the existing syntax structure. In this case the "Linear service" is mapped to Basic TV service.

In another embodiment, for example, the ServiceType element value 11 may be used for to identify a streaming on demand component, which may be an app-based service with app-based enhancement including an on demand component. For example, ServiceType element value 12 may be used to identify a file download on demand component, which may be an app-based enhancement including a non-real time content item component.

In another embodiment, any one of the above service type values may be indicated by a value within another element. For example, an AvailableContent element or attribute and its values could take one of the values from application component, non-real time content, on-demand component, and/or notification.

In another embodiment, the ServiceType value allocation may be done hierarchically. For example, the main service types may be a linear service and an app-based service, and each of these two types of services could include zero or more app-based enhancements components which can include application component, non-real time content, on demand component, and/or notification, a hierarchical allocation of ServiceType values may be done. In this case for "ServiceType" one of the bits of "unsigned Byte" (date type of ServiceType) could be used to signal a linear service (bit with value set to 1) or an app-based service (bit with value set to 0). Then the rest of the bits can signal the service types.

An example is illustrated as follows:
  224 (11100000 binary) Linear Service with App-Based Enhancement including application component
  240 (11110000 binary) App-Based Service with App-Based Enhancement including application component
  225 (11100001 binary) Linear Service with App-Based Enhancement including non-real time content
  241 (111100001 binary) App-Based Service with App-Based Enhancement including non-real time content
  226 (11100010 binary) Linear Service with App-Based Enhancement including on demand component
  242 (11110010 binary) App-Based Service with App-Based Enhancement including on demand component
  227 (11100011 binary) Linear Service with App-Based Enhancement including notification stream component
  243 (11110011 binary) App-Based Service with App-Based Enhancement including notification stream component
  228 (11100100 binary) Linear Service with generic service type
  243 (11110100 binary) App-Based Service with generic service type The generic service type may refer to the service different than a service which has application component or non-real-time content or on demand component. In some case the generic service type may be an "unknow" service type.

In yet another embodiment, the values may use contiguous ServiceType values. For example the service type values could be assigned as follows:
  224 Linear Service with App-Based Enhancement including application component
  225 App-Based Service with App-Based Enhancement including application component
  226 Linear Service with App-Based Enhancement including non-real time content
  227 App-Based Service with App-Based Enhancement including non-real time content
  228 Linear Service with App-Based Enhancement including on demand component
  229 App-Based Service with App-Based Enhancement including on demand component
  230 Linear Service with App-Based Enhancement including notification stream component
  231 App-Based Service with App-Based Enhancement including notification stream component In yet another embodiment the Linear/App-based service: App may be further split into two service types (and thus four total service types as) follows:
  Linear service: primary App (e.g. ServiceType value 224)
  Linear service: non primary app. (e.g. ServiceType value 225)
  App-based service: primary App (e.g. ServiceType value 234)
  App based service: non primary app. (e.g. ServiceType value 235)

Where a Primary App, may be an app which is activated as soon as the underlying service is selected. Also non-primary apps may be started later in the service.

In some embodiments, the service of the type Linear Service: On-Demand component may be forbidden. In that case, no ServiceType value may be assigned for that type of service.

Additional embodiments related to service signaling are described as follows. In general service announcement and service signaling may be as follows. Service Announcement may include information about programming and services that is designed to allow the viewer or user to make an informed selection about service or content. Service Signaling may include information that enables the receiver to locate and acquire services and to perform basic navigation of the service.

Figure 11:
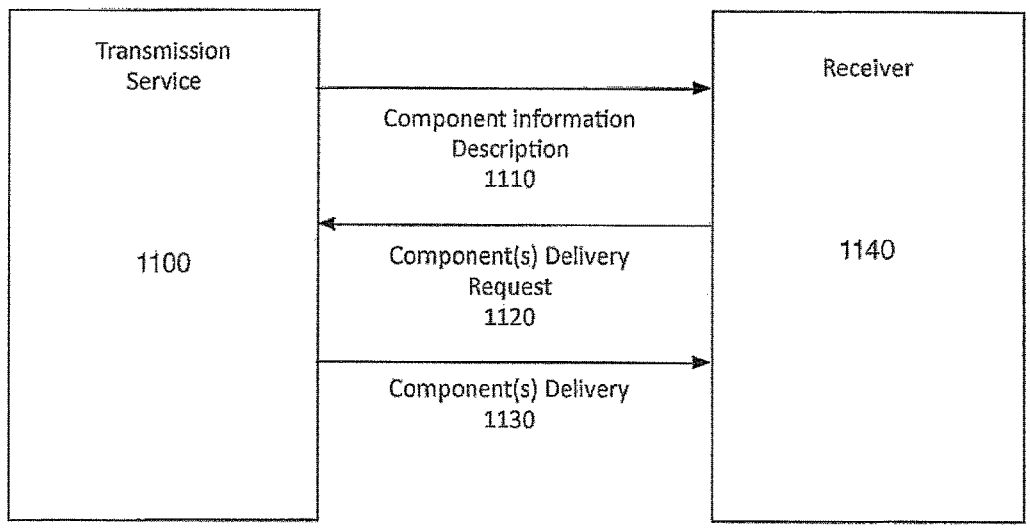
FIG. 11 illustrates component information description signaling.

Referring to FIG. 11 component information description signaling is described. The transmission service provider 1100 is an example of a provider of service configured to enable television services to be provided. For example, transmission service provider 1100 may include public over-the-air television networks, public or subscription-based satellite television service provider networks, over-the-top service networks, broadcast service networks, and public or subscription-based cable television provider networks. It should be noted that although in some examples transmission service provider 1100 may primarily be used to enable television services to be provided, transmission service 1100 provider may also enable other types of data and services to be provided according to any combination of the telecommunication protocols and messages described herein. Transmission service provider 1100 may comprise any combination of wireless and/or wired communication media. Transmission service provider 1100 may include coaxial cables, fiber optic cables, twisted pair cables, wireless transmitters and receivers, routers, switches, repeaters, base stations, or any other equipment that may be useful to facilitate communications between various devices and sites.

With respect to FIG. 11, receiver 1140 may include any device configured to receive a service from transmission service provider 1100. For example, a receiver 1140 may be equipped for wired and/or wireless communications and may include televisions, including so-called smart televisions, set top boxes, and digital video recorders. Further, the receiver 1140 may include desktop, laptop, or tablet computers, gaming consoles, mobile devices, including, for example, smartphones, cellular telephones, and personal gaming devices configured to receive service from transmission service provider 1100.

As a part of receiving service from transmission service 1100, the receiver 1140 may receive signaling information which may provide information about various media streams and data that may be received via delivery mechanism. In one embodiment the signaling information from transmissions service provider 1100 may include component information description 1110. An example of component information description is provided later with respect to FIGS. 13A, 13B, 15, and 17. After receiving this component information description 1110, the receiver 1140 may parse it or decode it. In one example the receiver 1140 may not be able to parse further signaling information until it parses the component information description 1110. In one example the receiver 1140 may display some or all of component information description 1110 to the viewer after decoding, parsing and rendering it. In some cases it may display this information on screen of the receiver device which can be viewed by the viewer. In an example case the viewer may make a decision based on this information that is received, parsed and displayed. In one example the decision may be to receive one or more components of the service. In this case the receiver 1140 may send a components delivery request 1120 for one or more components of the service to the transmission service provider 1100. In one example the receiver 1140 may receive delivery of requested components from transmission service 1110.

Figure 12:
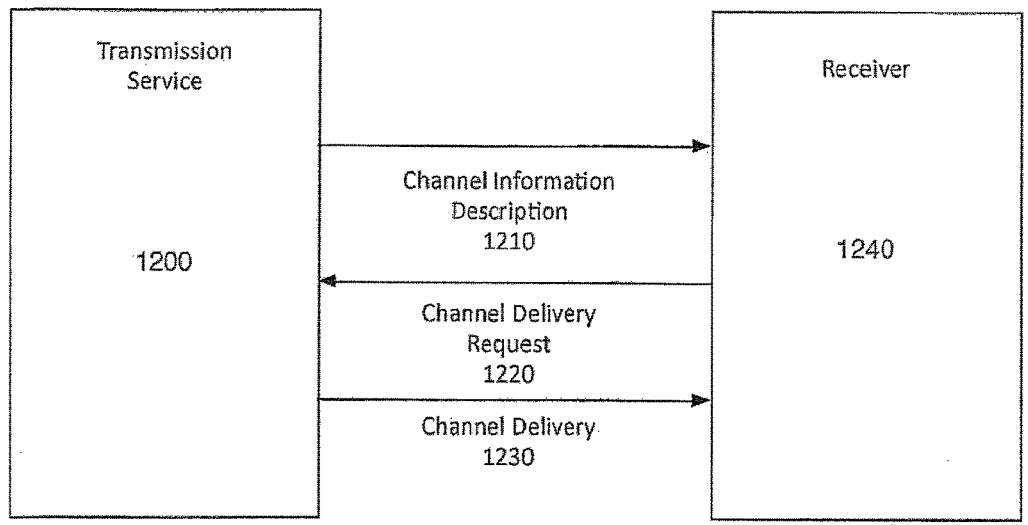
FIG. 12 illustrates channel information description signaling.

Referring to FIG. 12, channel information description signaling is described. The transmission service provider 1200 is an example of a provider of service configured to enable television services to be provided. For example, transmission service provider 1200 may include public over-the-air television networks, public or subscription-based satellite television service provider networks, over-the-top service networks, broadcast service networks, and public or subscription-based cable television provider networks. It should be noted that although in some examples transmission service provider 1200 may primarily be used to enable television services to be provided, transmission service provider 1200 may also enable other types of data and services to be provided according to any combination of the telecommunication protocols and messages described herein. Transmission service provider 1200 may comprise any combination of wireless and/or wired communication media. Transmission service provider 1200 may include coaxial cables, fiber optic cables, twisted pair cables, wireless transmitters and receivers, routers, switches, repeaters, base stations, or any other equipment that may be useful to facilitate communications between various devices and sites.

Referring to FIG. 12, the receiver 1240 may include any device configured to receive a service from transmission service provider 1200. For example, the receiver 1240 may be equipped for wired and/or wireless communications and may include televisions, including so-called smart televisions, set top boxes, and digital video recorders. Further, the receiver 1240 may include desktop, laptop, or tablet computers, gaming consoles, mobile devices, including, for example, smartphones, cellular telephones, and personal gaming devices configured to receive service from transmission service provider 1200.

As a part of receiving service from transmission service provider 1200, the receiver 1240 may receive signaling information which may provide information about various media streams and data that may be received via delivery mechanism. In one embodiment the signaling information from transmissions service provider 1200 may include channel information description 1210. An example of channel information description is provided later with respect to FIGS. 14A, 14B, 16, and 18. After receiving this channel information description 1210, the receiver 1240 may parse it or decode it. In one example the receiver 1240 may not be able to parse further signaling information until it parses the channel information description 1210. In one example the receiver 1240 may display some or all of channel information description 1210 to the viewer after decoding, parsing and rendering it. In some cases it may display this information on screen of the receiver device 1240 which can be viewed by the viewer. In an example case the viewer may make a decision based on this information that is received, parsed and displayed. In one example the decision may be to receive channel of the service. In this case the receiver 1240 may send a channel delivery request 1220 for the service to the transmission service provider 1200. In one example the receiver 1240 may receive delivery of channel from transmission service 1200.

FIGS. 13A-13B illustrate a binary syntax for a component information descriptor.

FIG. 13B includes fewer syntax elements compared to FIG. 13A and thus may be easier to transmit by the transmission service provider 1100 and may be easier to parse and decode by the receiver 1140.

The Component Information Descriptor of FIG. 13A and FIG. 13B provides information about the components available in the service. This includes information about number of components available in the service. For each available component following information is signaled: component type, component role, component name, component identifier, component protection flag. Audio, video, closed caption and application components can be signaled. Component role values are defined for audio, video and closed caption components.

The syntax for the Component Information Descriptor shall conform to the syntax shown in FIG. 13A or FIG. 13B. In another embodiment instead of all of the component information descriptor only some of the elements in it maybe signalled in the component information descriptor or inside some other descriptor or some other data structure.

Semantic meaning of the syntax elements in the component information descriptor of FIG. 13A and FIG. 13B may be as follows.

descriptor_tag—This is 8-bit unsigned integer for identifying this descriptor. Any suitable value between 0-255 which uniquely identifies this descriptor can be signaled. In one embodiment the format of this field may be uimsbf. In another embodiment some other format may be used which allows identifying the descriptor uniquely compared to other descriptors based on this descriptor_tag value.

descriptor_length—This 8-bit unsigned integer may specify the length (in bytes) immediately following the field num_components up to the end of this descriptor. In some embodiments instead of 8-bit, this field may be 16-bit.

num_components—This 8-bit unsigned integer field may specify the number of components available for this service. The value of this field may be in the range of 1 to 127 inclusive. Values 128-255 are reserved. In an alternative embodiment this field may be split into two separate fields: a 7-bit unsigned integer field num_components and a 1 bit reserved field.

component_type—This 3-bit unsigned integer may specify the component type of this component available in the service. Value of 0 indicates an audio component. Value of 1 indicates a video component. Value of 2 indicated a closed caption component. Value of 3 indicates an application component. Values 4 to 7 are reserved.

component_role—This 4-bit unsigned integer may specify the role or kind of this component. The defined values include one or more:

For audio component (when component_type field above is equal to 0) values of component_role are as follows:
0=Complete main,
1=Music and Effects,
2=Dialog,
3=Commentary,
4=Visually Impaired,
5=Hearing Impaired,
6=Voice-Over,
7-14=reserved,
15=unknown In another embodiment additionally component_role values for audio may be defined as follows: 7=Emergency, 8=Karaoke. In this case the values 9-14 will be reserved and 15 will be used to signal unknown audio role.

For Video (when component_type field above is equal to 1) values of component_role are as follows:
0=Primary video,
1=Alternative camera view,
2=Other alternative video component,
3=Sign language inset,
4=Follow subject video,
5=3D video left view,
6=3D video right view,
7=3D video depth information,
8=Part of video array <x,y> of <n,m>,
9=Follow-Subject metadata,
10-14=reserved,
15=unknown For Closed Caption component (when component_type field above is equal to 2) values of component_role are as follows:
0=Normal,
1=Easy reader,
2-14=reserved,
15=unknown.

When component_type field above is between 3 to 7, inclusive, the component_role shall be equal to 15.

component_protected_flag—This 1-bit flag indicates if this component is protected (e.g. encrypted). When this flag is set to a value of 1 this component is protected (e.g. encrypted). When this flag is set to a value of 0 this component is not protected (e.g. encrypted).

component_id—This 8-bit unsigned integer nay specify the component identifier of this component available in this service. The component_id may be unique within the service.

component_name_length—This 8-bit unsigned integer may specify the length (in bytes) of the component_name_bytes( ) field which immediately follows this field.

component_name_bytes( )—Short human readable name of the component in "English" language. Each character of which may be encoded per UTF-8.

With respect to FIG. 13A, FIG. 13B, FIG. 14A, FIG. 14B the format column of the descriptor may be interpreted as follows.

TBD: means to be decided as described above.

uimsbf: means Unsigned Integer, Most Significant Bit First, bslbf: means Bit string, left bit first.

FIGS. 14A-14B illustrate a binary syntax for a channel information descriptor. The Channel Descriptor of FIG. 14A and FIG. 14B provides information about the channel(s) in the service. This includes Major channel number, minor channel number, primary channel language, channel genre, channel description (in multiple languages) and channel icon.

The syntax for the Channel Descriptor shall conform to the syntax shown in FIG. 14A or FIG. 14B. In another embodiment instead of all of the channel descriptor only some of the elements in it maybe signalled in the channel descriptor or inside some other descriptor or some other data structure.

Semantic meaning of the syntax elements in the channel descriptor of FIG. 14A and FIG. 14B is as follows.

descriptor_tag—This is 8-bit unsigned integer for identifying this descriptor. Any suitable value between 0-255 which uniquely identifies this descriptor can be signaled. In one embodiment the format of this field may be uimsbf. In another embodiment some other format may be used which allows identifying the descriptor uniquely compared to other descriptors based on this descriptor_tag value.

descriptor_length—This 8-bit unsigned integer may specify the length (in bytes) immediately following this field up to the end of this descriptor.

major_channel_num—This 16-bit unsigned integer may specify the major channel number of the service. In another embodiment the bit width of 8-bit or 12-bit may be used for this field instead of 16-bit.

minor_channel_num—This 16-bit unsigned integer may specify the minor channel number of the service in the case of channel descriptor shown in FIG. 14A. In another embodiment the bit width of 8-bit or 12-bit may be used for this field instead of 16-bit.

In the case of channel descriptor shown in FIG. 14B the bit width is changed to 15-bit. Thus for FIG. 14B this 15-bit unsigned integer may specify the minor channel number of the service. In another embodiment the bit width of 7-bit or 11-bit may be used for this field instead of 15-bit.

service_lang_code—Primary language used in the service. This field shall consist of one of the 3 letter code in ISO 639-3 titled "Codes for the representation of names of languages—Part 3: Alpha-3 code for comprehensive coverage of languages available at http://www.iso.org which is incorporated by reference in its entirety here by reference. In other embodiments a pre-defined list of languages may be defined and this filed can be an index into the list of those fields. In an alternate embodiment 16 bits may be used for this field since upper bound for the number of languages that can be represented is 26*26*26 i.e. 17576 or 17576–547=17030.

service_lang_genre—Primary genre of the service. The service_lang_genre element shall be instantiated to describe the genre category for the service. The <classificationSchemeURI> is http://www.atsc.org/XMLSchemas/mh/2009/1.0/genre-cs/ and the value of service_lang_genre may match a termID value from the classification schema in Annex B of A/153 Part 4 document titled "ATSC-Mobile DTV Standard, Part 4—Announcement" available at http://www.atsc.org which is incorporated in its entirety here by reference.

icon_url_length—This 8-bit unsigned integer shall specify the length (in bytes) of the icon_url_bytes( ) field which immediately follows this field.

icon_url_bytes( )—Uniform Resource Locator (URL) for the icon used to represent this service. Each character shall be encoded per UTF-8.

service_descriptor_length—This 8-bit unsigned integer may specify the length (in bytes) of the service_descr_bytes( ) field which immediately follows this field.

service_descr_bytes( )—Short description of the service. Either in "English" language or in the language identified by the value of service_lang_code field in this descriptor. Each character of which may be encoded per UTF-8.

The values of icon_url_length and service_descriptor_length are constrained as specified by the value of the descriptor_length field which provides information about the length of this entire descriptor.

With respect to FIG. 14B and additional syntax element is as follows:

ext_channel_info_present_flag—This 1-bit Boolean flag that may indicate, when set to '1', that extended channel information fields for this service including the fields service_lang_code, service_genre_code, service_descr_length, service_descr_bytes( ), icon_url_length, icon_url_bytes( ) are present in this descriptor. A value of '0', shall indicate that extended channel information fields for this service including the fields service_lang_code, service_genre_code, service_descr_length, service_descr_bytes( ), icon_url_length, icon_url_bytes( ) are not present in this descriptor.

Thus when using the channel descriptor shown in FIG. 14B by setting the ext_channel_info_present_flag value to 1 fewer elements compared to FIG. 14A can be signaled in the descriptor and thus it may be easier to transmit by the transmission service provider 1200 and may be easier to parse and decode by the receiver 1240.

In some embodiments it may be a requirement of bitstream conformance that when channel information descriptor (e.g. FIG. 14B) is included in a fast information channel then ext_channel_info_present_flag shall be equal to 0. In another embodiment when channel information descriptor (e.g. FIG. 14B) is included for signaling in a location where bit efficiency is required then ext_channel_info_present_flag shall be equal to 0.

In yet another embodiment it may be a requirement of a bitstream conformance that ext_channel_info_present_flag shall be equal to 1.

In addition to the binary syntax of FIG. 13A or FIG. 13B for the component information descriptor, a different representation may be used. FIG. 15 illustrates a XML syntax and semantics for a component information descriptor. FIG. 17 illustrates a XML schema for a component information descriptor.

In addition to the binary syntax of FIG. 14A or FIG. 14B for the channel information descriptor, a different representation may be used. FIG. 16 illustrates a XML syntax and semantics for a channel information descriptor.

FIG. 18 illustrates a XML schema for a channel information descriptor.

Although FIG. 13 through FIG. 18 show particular embodiments of syntax, semantics and schema, additional variants are possible. These include the following variations:

Different data types may be used for an element compared to those shown above. For example instead of unsignedByte data type unsignedShort data type may be used. In another example instead of unsigned Byte data type a String data type may be used.

Instead of signalling a syntax as an attribute it may be signalled as an element. Instead of signalling a syntax as an element it may be signalled as an attribute.

The bit width of various fields may be changed for example instead of 4 bits for an element in the bitstream syntax 5 bits or 8 bits or 2 bits may be used. The actual values listed here are just examples.

Instead of XML format and XML schema Javascript Object Notation (JSON) format and JSON schema may be used. Alternatively the proposed syntax elements may be signalled using a Comma Separated Values (CSV), Backus-Naur Form (BNF), Augmented Backus-Naur Form (ABNF), or Extended Backus-Naur Form (EBNF).

Cardinality of an element and/or attribute may be changed. For example For example cardinality may be changed from "1" to "1 . . . N" or cardinality may be changed from "1" to "0 . . . N" or cardinality may be changed from "1" to "0 . . . 1" or cardinality may be changed from "0 . . . 1" to "0 . . . N" or cardinality may be changed from "0 . . . N" to "0 . . . 1".

An element and/or attribute may be made required when it is shown above as optional. An element and/or attribute may be made optional when it is shown above as required.

Some child elements may instead be signalled as parent elements or they may be signalled as child elements of another child elements.

All the above variants are intended to be within the scope of the present invention.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding a service guide by a decoder associated with a service comprising a media bitstream comprising:
   (a) receiving a service fragment within said service guide by said decoder; wherein said service fragment includes information on service content, genre, and service location;
   (b) receiving a service media extension within said service fragment within said service guide by said decoder;
   (c) receiving a major channel number within said service media extension by said decoder; wherein the major channel number is an XML field of data type "String"; wherein the XML field has a language attribute;
   (d) receiving a minor channel number within said service media extension by said decoder; wherein the minor channel number is an XML field of data type "String"; wherein the XML field has a language attribute;
   (e) receiving at least one icon within said service media extension by said decoder; wherein the at least one icon represents a service; wherein the at least one icon is capable of having different height and width;
   (f) receiving a url within the said at least one icon; wherein the url refers to the service defined in the service guide;
   (g) decoding and parsing said service guide by said decoder including said service fragment, said service media extension, said major channel number, said minor channel number, said icon and said url.

2. The method of claim 1 further comprising selecting a media bitstream to provide service based upon said decoded service guide.

3. The method of claim 1 further comprising rendering content of said decoded service guide on a display.

4. The method of claim 1 further comprising accessing a media bitstream based upon said decoded service guide.

\* \* \* \* \*